US008831008B1

(12) United States Patent
Gostev et al.

(10) Patent No.: US 8,831,008 B1
(45) Date of Patent: Sep. 9, 2014

(54) RELIABLE MESSAGE DELIVERY IN MESH NETWORKS

(71) Applicant: Cubic Corporation, San Diego, CA (US)

(72) Inventors: Anatoli Gostev, San Jose, CA (US); Paul Berenberg, Mountain View, CA (US)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 14/062,689

(22) Filed: Oct. 24, 2013

Related U.S. Application Data

(60) Provisional application No. 61/814,058, filed on Apr. 19, 2013.

(51) Int. Cl.
*H04L 12/28* (2006.01)
(52) U.S. Cl.
USPC .......................................... 370/396; 370/400
(58) Field of Classification Search
CPC ............................... H04W 84/18; H04W 40/38
USPC .................................................. 370/396, 400
See application file for complete search history.

(56) References Cited

U.S. PATENT DOCUMENTS

| 7,114,388 | B1* | 10/2006 | French et al. ............... 73/170.16 |
| 7,668,163 | B2* | 2/2010 | Hall et al. ...................... 370/389 |
| 7,848,223 | B2* | 12/2010 | Budampati et al. ........... 370/216 |
| 8,194,679 | B2* | 6/2012 | Woloszynski et al. ... 370/395.31 |
| 8,275,313 | B1* | 9/2012 | Myers et al. .................. 455/41.2 |
| 2005/0111428 | A1* | 5/2005 | Orlik et al. ..................... 370/344 |
| 2006/0056421 | A1* | 3/2006 | Zaki .............................. 370/400 |
| 2007/0189191 | A1* | 8/2007 | Ades ............................. 370/254 |
| 2008/0225703 | A1* | 9/2008 | Rider et al. ................... 370/229 |
| 2009/0268742 | A1* | 10/2009 | Hama ........................... 370/400 |

* cited by examiner

*Primary Examiner* — Warner Wong
(74) *Attorney, Agent, or Firm* — Kilpatrick Townsend & Stockton LLP

(57) ABSTRACT

A method of transmitting a packet in a low-power, ad-hoc, wireless mesh network may include receiving the packet at a first node. The network may include a plurality of nodes, and the plurality of nodes may include the first node. The method may also include transmitting, at a first time, the packet from the first node to a second node in the plurality of nodes. The method may additionally include receiving, at a second time, an indication from the second node that the second node successfully transmitted the packet to a third node. The method may further include maintaining a stored copy of the packet at the first node between the first time and the second time for retransmission.

20 Claims, 11 Drawing Sheets

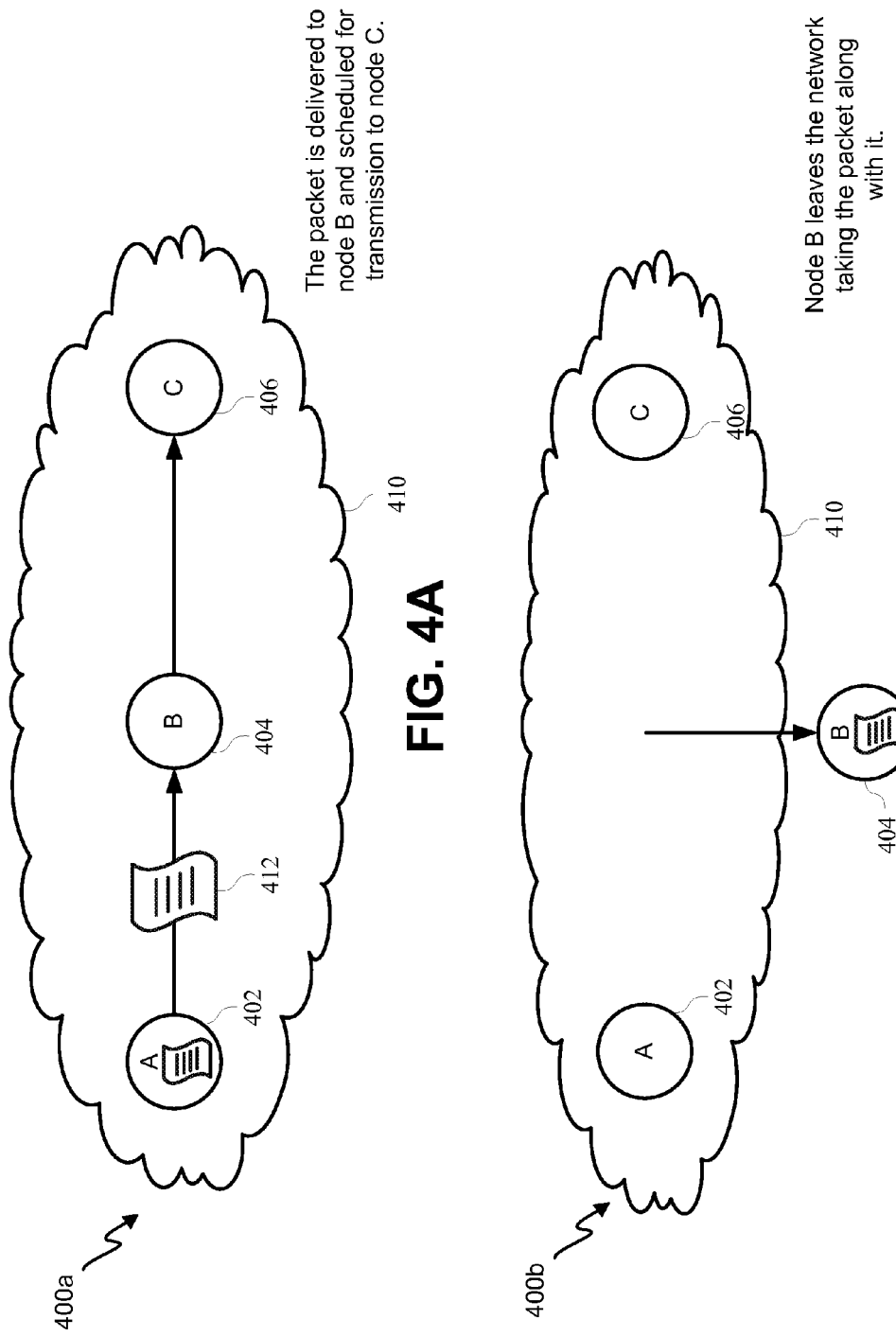

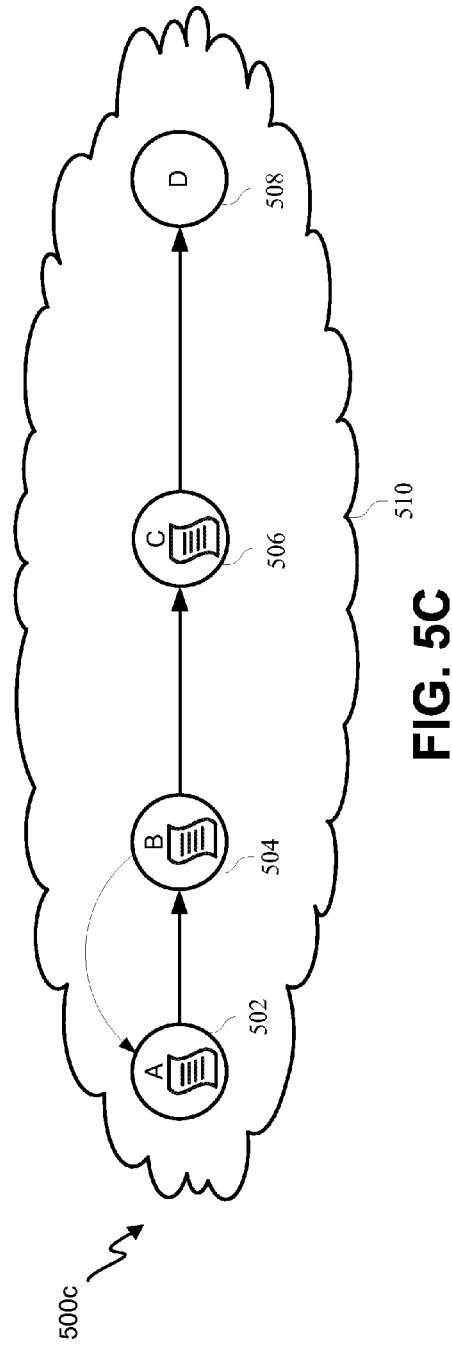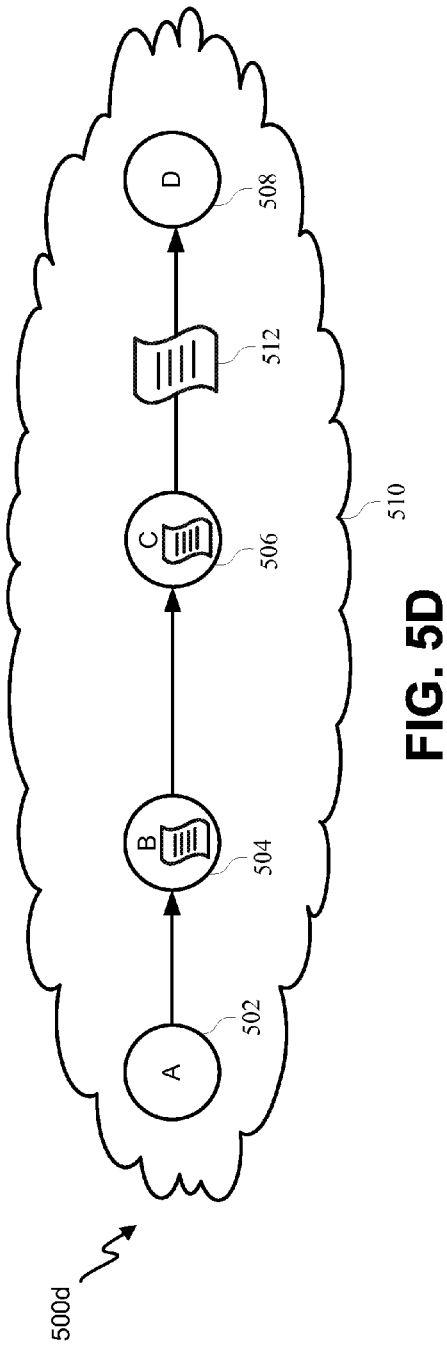

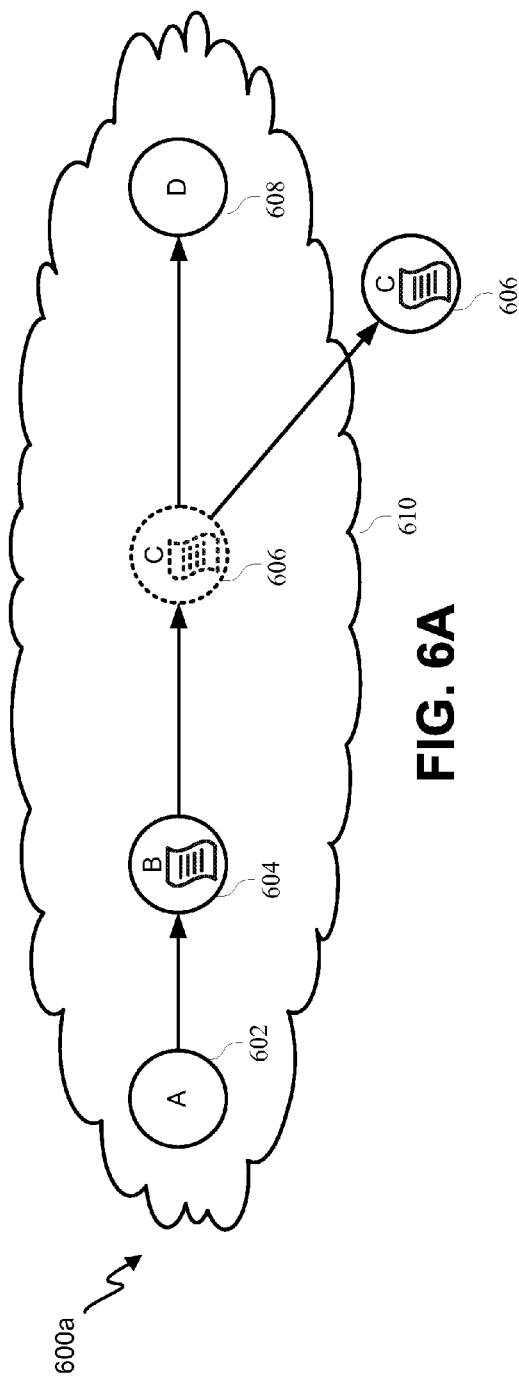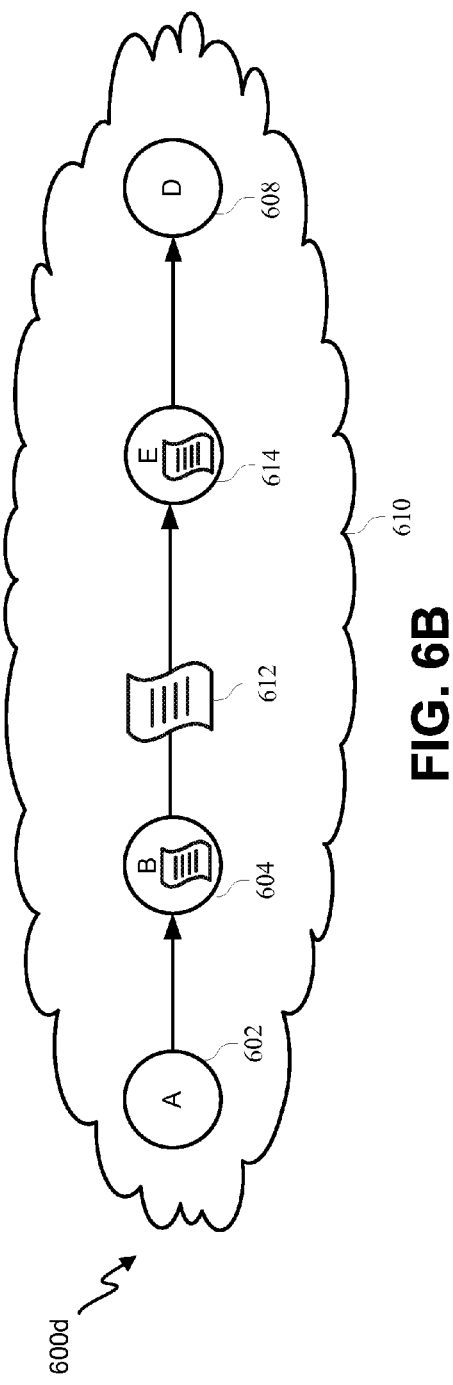
FIG. 6A
FIG. 6B

RELIABLE MESSAGE DELIVERY IN MESH NETWORKS

CROSS-REFERENCES TO RELATED APPLICATIONS

The present application claims benefit under 35 USC 119 (e) of and is a nonprovisional of U.S. Provisional Patent Application No. 61/814,058, filed May 17, 2013, entitled "RELIABLE MESSAGE DELIVERY IN MESH NETWORKS", the entire contents of which are incorporated by reference herein for all purposes.

STATEMENT AS TO RIGHTS TO INVENTIONS MADE UNDER FEDERALLY SPONSORED RESEARCH AND DEVELOPMENT

This invention may have been made with government support under contract ARINC 400-10. The government may have certain rights in the invention.

BACKGROUND

Wireless mesh networks have become an important part of modern communication infrastructures. Wireless devices, such as cellular phones, sensor units, recording devices, and/or the like, can be used to provide information from many disparate locations for data analysis and retransmission. The ad hoc nature of these networks often requires transmission of a single packet through multiple hops (nodes) in the network in order to reach its final destination. Therefore, reliably transmitting a message from a source node to a destination node may be impacted by the individual reliability of each node in a transmission path. The reliability of each node may depend on location, power consumption, geographic interference, and/or the like. Message reliability may become a serious problem in wireless mesh networks where low-power usage is a major concern.

BRIEF SUMMARY

In some embodiments, a method of transmitting a packet in a low-power, ad-hoc, wireless mesh network may be presented. The method may include receiving the packet at a first node. The network may include a plurality of nodes, and the plurality of nodes may include the first node. The method may also include transmitting, at a first time, the packet from the first node to a second node in the plurality of nodes. The method may additionally include receiving, at a second time, an indication from the second node that the second node successfully transmitted the packet to a third node. The method may further include maintaining a stored copy of the packet at the first node between the first time and the second time for retransmission.

In another embodiment, a computer-readable memory may be presented. The computer-readable memory may comprise a sequence of instructions which, when executed by one or more processors, causes the one or more processors to transmit a packet in a low-power, ad-hoc, wireless mesh network. The instructions may cause the processor(s) to operate by receiving the packet at a first node. The network may include a plurality of nodes, and the plurality of nodes may include the first node. The instructions may also cause the processor (s) to operate by transmitting, at a first time, the packet from the first node to a second node in the plurality of nodes. The instructions may additionally cause the processor(s) to operate by receiving, at a second time, an indication from the second node that the second node successfully transmitted the packet to a third node. The instructions may further cause the processor(s) to operate by maintaining a stored copy of the packet at the first node between the first time and the second time for retransmission.

In yet another embodiment, a system may be presented. The system may include one or more processors and a memory communicatively coupled with and readable by the one or more processors. The memory may comprise a sequence of instructions which, when executed by the one or more processors, cause the one or more processors to transmit a packet in a low-power, ad-hoc, wireless mesh network. The instructions may cause the processor(s) to operate by receiving the packet at a first node. The network may include a plurality of nodes, and the plurality of nodes may include the first node. The instructions may also cause the processor(s) to operate by transmitting, at a first time, the packet from the first node to a second node in the plurality of nodes. The instructions may additionally cause the processor(s) to operate by receiving, at a second time, an indication from the second node that the second node successfully transmitted the packet to a third node. The instructions may further cause the processor(s) to operate by maintaining a stored copy of the packet at the first node between the first time and the second time for retransmission.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIGS. 4A-4B illustrate flow diagrams of a wireless network losing a packet, according to some embodiments.

FIGS. 5A-5D illustrate flow diagrams of a reliable message delivery architecture in a mesh network, according to some embodiments.

FIGS. 6A-6B illustrate flow diagrams of a reliable message delivery with retransmission, according to some embodiments.

DETAILED DESCRIPTION

Figure 1:
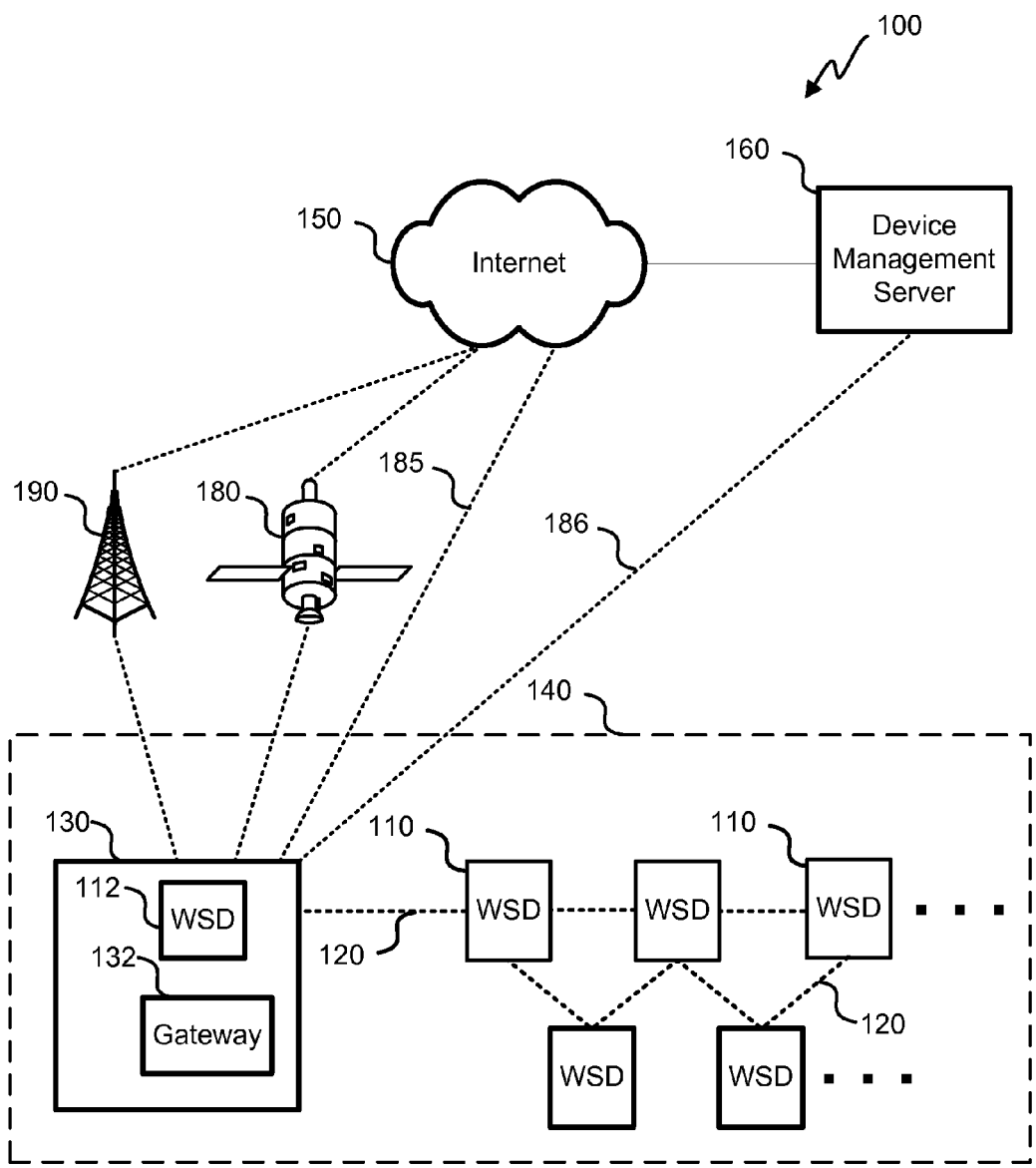
FIG. 1 illustrates a block diagram of a wireless network, according to some embodiments.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments described herein may implement reliable message delivery in wireless networks. Generally, these embodiments may be used in any type of wireless network including networks where ordinary end-to-end acknowledgment, timeout, and retransmission protocols are less effective because of high latency and/or low traffic throughput of the wireless network. Additionally, the links between nodes may be random and/or dynamic. During operation, individual nodes may frequently leave and join the network. As messages are routed through the wireless network, they may hop across many different nodes. Because the reliability of individual nodes may be in question, this creates an environment wherein reliable message delivery becomes a challenge. In these systems, end-to-end acknowledgment, timeout, and retransmission mechanisms may become ineffective because the high latency and low traffic throughput may result in messages taking a long time to reach its final destination. In some systems, messages may take between minutes and hours to traverse the network.

The potential for long transmission times makes it very difficult to estimate a timeout interval. If a timeout interval is set too short, it may lead to multiple retransmissions and cause duplicated messages. Considering limited network resources, duplicated messages can significantly degrade network performance. On the other hand, if the timeout is set too long, the source or destination nodes may leave the network before message retransmission. Therefore, setting an end-to-end timeout interval for a complete packet transmission can be very difficult for multi-hop transmissions.

Even though the link layer cannot provide reliable end-to-end transmissions, the link layer can provide reliable node-to-node transmissions. However, because of the dynamic nature of the network, some intermediate nodes along the message route may leave the network and carry the message away with them. Some embodiments described herein may utilize both the link layer and the net layer of standard transmission protocols in order to reliably verify that multi-hop transmissions are being completed.

Wireless networks may include may different types of wireless network devices. What are referred to herein as wireless sensor devices (WSDs) may include sensor units used in applications such as asset tracking, security systems, smart home devices, military systems, and/or the like. In some embodiments, WSDs may include cellular telephones, smart phones, PDAs, and/or the like connected through a cellular network. In some cases, smart phones and other WSDs may be connected through local networks or directly to each other without traveling through a base station, gateway, and/or the like.

Wireless networks may be configured in a variety of ways and in a variety of contexts. Example configurations include mesh, point-to-point, and/or ad hoc networks, among others. The flexible nature of these networks—enabling network devices, or nodes, to join and leave these networks dynamically—together with WSDs configured to collect and communicate sensor information, enables these networks to provide end-to-end flexibility that may be essential for ad hoc situations. Although disclosed embodiments focus on wireless technologies, the techniques described herein can be applied to wired communication networks, such as an ad-hoc serial interface, for example.

In one exemplary embodiment, a wireless network can comprise a plurality of WSDs providing sensor information relating to a plurality of cargo containers located in a depot. The sensor information can include data from a variety of sensors, which can indicate the temperature and/or humidity of a container, whether the container door is or has been opened, whether the container is experiencing or has experienced a shock, the location of the container, whether the container is moving, and more. The wireless network further can include a gateway device that collects the sensor information and provides it to systems outside the wireless network. As WSD-equipped containers enter and leave the depot, the wireless network will adjust accordingly, enabling WSDs of containers entering the depot to join the wireless network while the WSDs of containers leaving the depot are dropped from the wireless network. Furthermore, WSDs can act as routers to relay sensor information from other WSDs that are not in direct communication with the depot's gateway device.

Low-power wireless networks can be advantageous in transportation, logistical, and similar applications where network devices are mobile devices operating on battery power. Although many battery-operated mobile devices utilize wireless technologies, most mobile devices exhaust their batteries in a matter of hours or days. The term "low-power wireless networks" as used herein refers to wireless networks utilizing technologies that enable battery-powered devices to operate for approximately a year or more without exhausting their batteries. This can include technologies associated with the IEEE 802.15.4 and/or ISO/IEC 18000-7 standards, as well as various proprietary technologies, among others.

FIG. 1 illustrates a block diagram of a wireless network 100, according to some embodiments. In this type of embodiment, a plurality of WSDs 110 may be networked together to generate and communicate data. A WSD 110 gathering sensor information (such as cellular voice or data transmissions, environmental conditions, security information, etc.) can communicate the sensor information toward a network interface 130 using a wireless connection 120. If there are one or more WSDs 110 communicatively linked between the WSD 110 originating the sensor information and the network interface 130, the one or more WSDs 110 can relay the sensor information until it reaches the network interface 130. The wireless network 100 depicted in FIG. 1 is shown as an example and is not meant to be limiting. A sensor network 140 can be configured in a variety of ways. For instance, the network interface 130 can connect with multiple WSDs 110, and WSDs 110 can have more or fewer wireless connections 120 than indicated in FIG. 1. Moreover, multiple network interfaces 130 and/or sensor networks 140 may be included in a logistical management system 100.

In some embodiments, the network interface 130 may comprise a gateway 132 configured to receive information for multiple WSDs 110. In other embodiments, the network interface 130 may simply comprise one of the WSDs 112 in the sensor network 140. In other configurations, each WSD 110 may act as a network interface 130 at different times and in different circumstances. This may allow the sensor network 140 to recover gracefully when one of the WSDs 110 drops out of the sensor network 140.

The network interface 130 may provide connectivity between sensor network 140 and a device management system (DMS) 160. Communication between the network interface 130 and the DMS 160 can be relayed through the Internet 150, or any other Wide Area Network (WAN). Additionally or alternatively, other networks, such as Local Area Networks (LANs), can be used. Other configurations can include a network interface 130 communicating directly with the DMS 160 without a separate network. The network interface 130 may also communicate through various intermediaries, including a cellular base station 190, a satellite communication system 180, or a wire connection 185 to the Internet 150.

The DMS 160 provides an interface between the sensor network 140 that can be used by a human user or another system, by utilizing, for example, a graphical user interface (GUI) and/or an application programmable interface (API). The DMS 160 can collect and store information from the WSDs 110. The data communicated between the DMS 160 and the network interface 130 can be securely communicated in encrypted packets, and the DMS 160 can provide secure management of the collected data. In some embodiments, the DMS 160 may comprise a cellular network operator, such as Verizon®, AT&T®, and/or the like. It should be noted that in some embodiments, the sensor network 140 may operate independently from the DMS 160. In some embodiments, the DMS 160 may be eliminated altogether.

One or more of a variety of physical layers may be used to provide the wireless connections 120 of the sensor network 140. According to one embodiment, the WSDs 110 and network interface 130 communicate using a protocol stack based on IEEE 802.15.4 standard at 2.4 GHz using all 16 channels available in that standard. This physical layer enables the sensor network 140 to operate using very low power and/or predictable power consumption—which can be an important consideration for embodiments in which the WSDs 110 and/or network interface 130 operate on battery power. Nonetheless, other wireless technologies may be used, including IEEE 802.15.4 at 900 MHz; IEEE 802.11; Bluetooth®; IEEE 802.16; Ultra Wideband (UWB); 433 MHz Industrial, Scientific, and Medical (ISM) Band; cellular; optical; and more, using multiple RF channels (e.g., narrow-band frequency hopping) or a single RF channel. The network interface 130 can communicate with the Internet 150 through a wired connection and/or a wireless connection, as described above.

Figure 2:
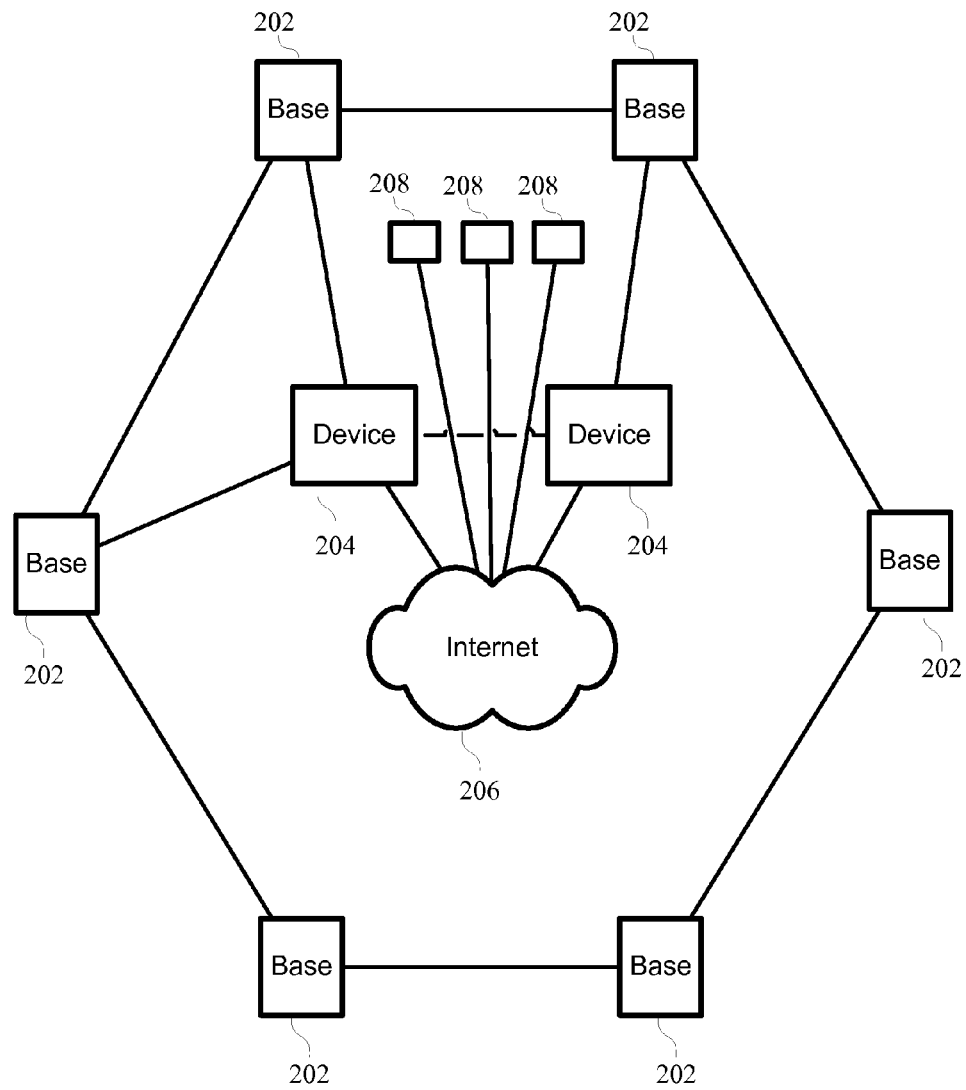
FIG. 2 illustrates a block diagram of another wireless network, according to some embodiments.

FIG. 2 illustrates a block diagram of another wireless network, according to some embodiments. In this particular embodiment, devices 204 may include any of the WSDs described above. For example, devices 204 may include smart phones. Devices 204 may be in communication with one or more base stations 202 to transmit cellular voice and data packets throughout a wireless network. It should be noted, that generally a base station 202 is not considered a wireless device. However, a base station 202 may be considered a node in an overall wireless network.

In some embodiments, the devices 204 may communicate by means other than through base stations 202. For example, the devices 204 may communicate directly with one another using the various wireless protocols described above. The devices 204 may communicate in a direct mobile-to-mobile fashion. In other examples, the devices 204 may communicate directly with an external network, such as the Internet 204, a LAN, a WAN, and/or the like. In other embodiments, the devices 204 may communicate with other electronic devices 208 in a wired or wireless fashion. The other electronic devices 208 may include printers, headsets, movie players, televisions, appliances, and/or the like. As used herein, these other electronic devices 208 may be considered nodes within a wireless network, and in some cases may be wireless devices themselves. Therefore, the devices 204 as well as a other electronic devices 208 may be source or destination nodes when transmitting packets through a wireless network.

Figure 3:
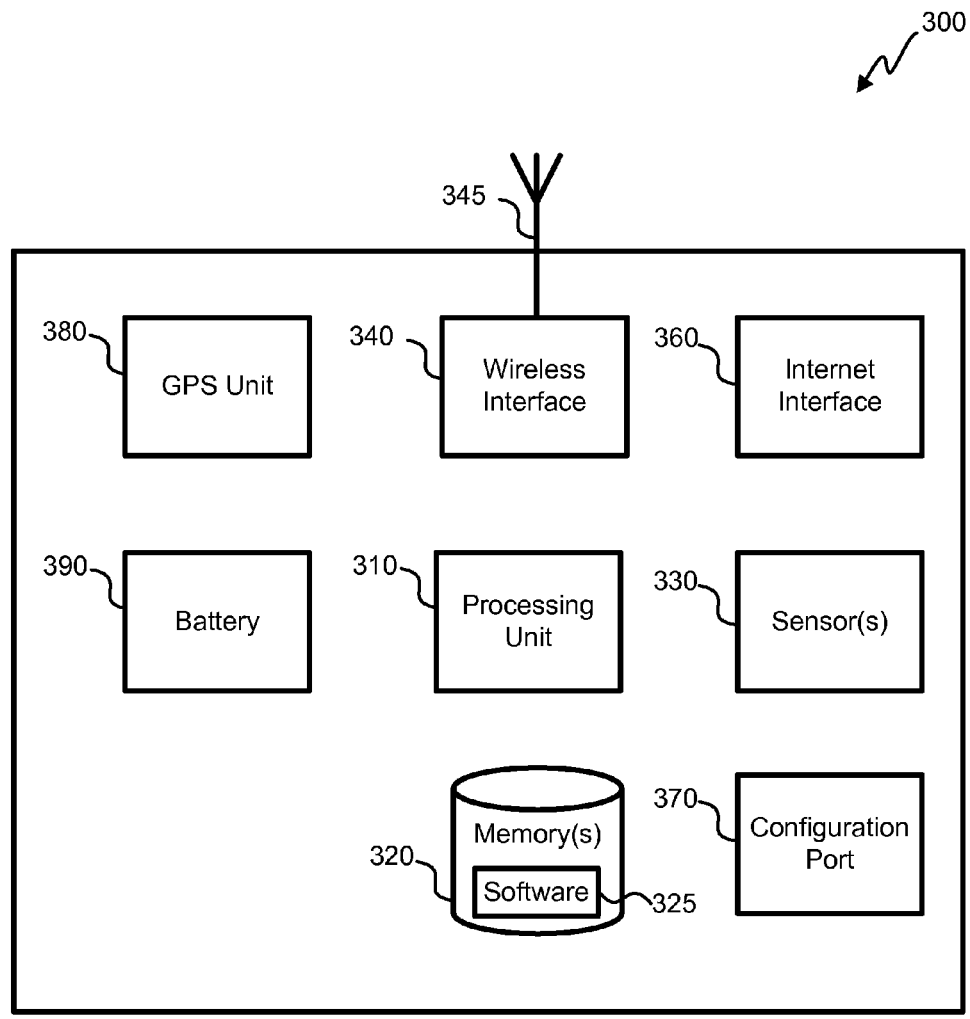
FIG. 3 illustrates a block diagram of a wireless sensor device, according to some embodiments.
Figure 9:
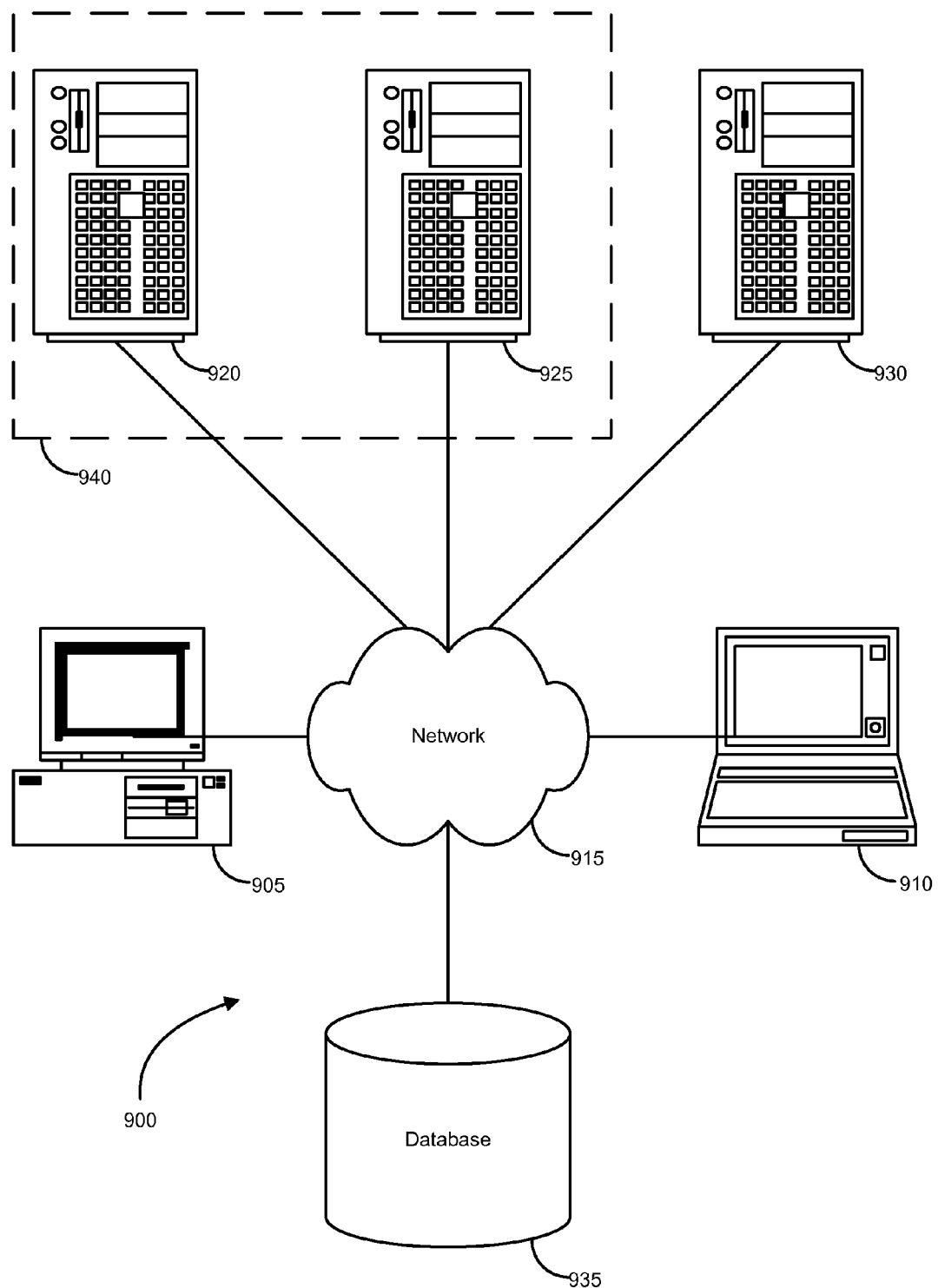
FIG. 9 illustrates a block diagram of components of an exemplary operating environment in which various embodiments of the present invention may be implemented.
Figure 10:
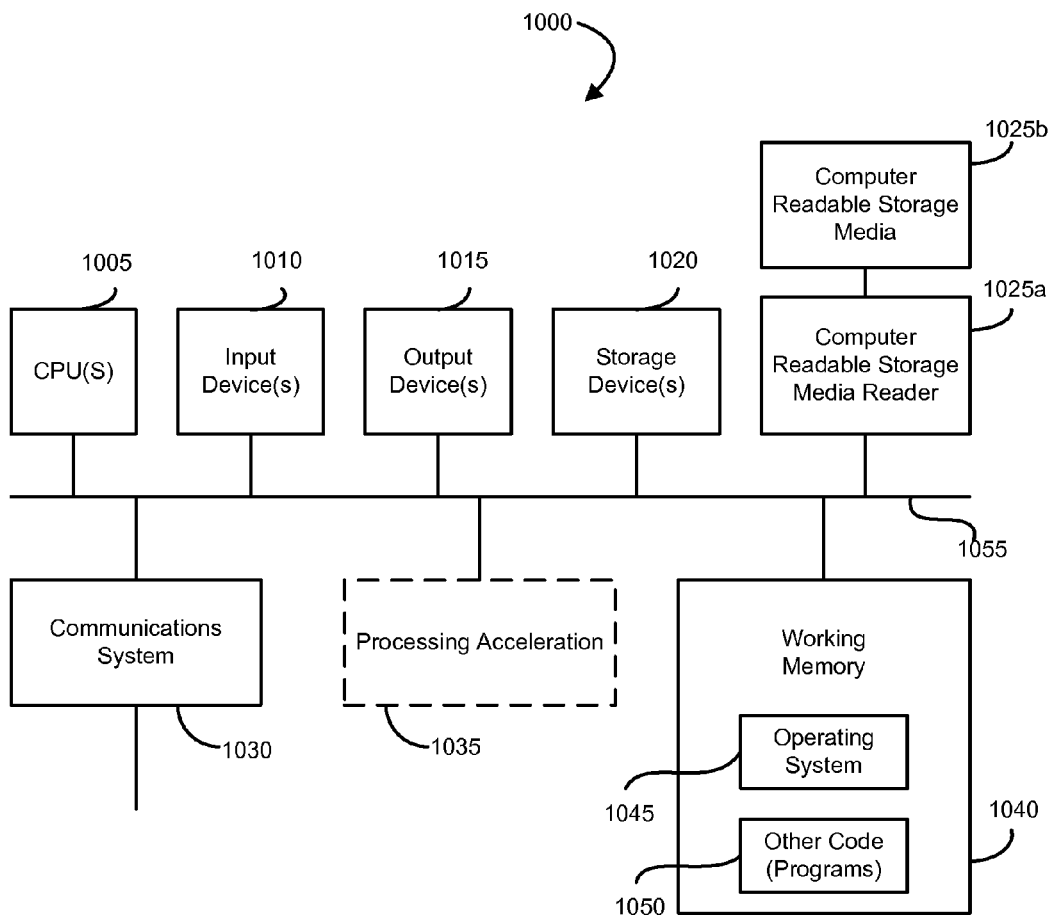
FIG. 10 illustrates a block diagram of an exemplary computer system in which embodiments of the present invention may be implemented.

The methods and systems described herein may be implemented using a general purpose computer system and/or a network computer environment, such as those described in relation to FIG. 9 and FIG. 10. In other embodiments, a dedicated hardware platform may be designed to implement the functionality described herein. This dedicated hardware may be designed using processors, memories, microcontrollers, buses, communication ports, network access ports, adapters, digital circuits, analog circuits, instruction sets, and/or the like, that are well-known in the art and would be readily understood by one having skill in the art. FIG. 3 represents an abstraction of the functions that may be implemented using these types of hardware. After reading this disclosure, one having skill in the art could use these well-known circuit elements to construct the device shown in FIG. 3 to implement these methods and systems.

FIG. 3 illustrates a block diagram of a WSD 300, according to some embodiments. This embodiment includes many components, such as sensor(s) 330 including microphones, cameras, ambient light detectors, user input devices, keyboards, and/or the like. The WSD 300 may also include one or more processing units 310, memories 320, and/or wireless interfaces 340. In some embodiments, the processing unit 310 can comprise a microprocessor and the memory 320 and software 325 can comprise programmed logic of the microprocessor. It can also be noted that the WSD 300 can include an interface (not shown) to provide a user with information. Such an interface can comprise a liquid-crystal display (LCD), one or more light emitting diodes (LEDs), etc.

WSD 300 may further include a battery 390. Because the wireless network can provide lower-power consumption, a battery having a long shelf life—such as an alkaline-, silver-oxide-, or lithium-based battery—can provide for operability of the WSD 300 without the need to change batteries for several years. According to one embodiment, a WSD 300 uses up to 4 A-size 3.6 volt (V) batteries, each battery rated at approximately 3600 milliamp hours (mAh). Some embodiments of the WSD 300 have an operating power of under 2 milliwatts (mW); other embodiments of the WSD operate under 1 mW. Therefore, depending on the battery's shelf life and capacity, as well as the configuration of the WSD 300, the WSD 300 can operate for 10 years or more without the need to change the battery.

The WSD 300 can also include a GPS unit 380 to provide location information. Location information can be particularly useful where a sensor network 140 is spread over a large physical area. Moreover, the GPS unit 380 further can be used to sense motion of the WSD 300 by determining, by the GPS unit 380 and/or the processing unit 310, a change in location over time. Additionally, the WSD 300 may include a configuration port 370, such as a USB port, micro USB port, serial port, and/or the like, that may be used to program the WSD 300 or otherwise receive configuration information. The WSD 300 may also include an Internet interface 360, such as an ethernet port. An antenna 345 may also be used to communicate with a gateway, a base station, satellite communication system, and/or another WSD 300 as described above.

In some embodiments, the various modules and systems in FIG. 3 may reside on separate chips and digital systems. Alternatively, multiple modules may be combined on the same or similar chips and digital systems. In addition, some modules may be combined together into a single module performing the functions of both individual modules. Similarly, a single module may be split into multiple modules. It will be understood in light of this disclosure that any arrangement of the modules, as well as any implementation in both software and hardware, may be used by various embodiments.

During normal multi-hop transmissions in a wireless mesh network, a packet may originate with a source node to be sent to a destination node. Many different nodes in the mesh network may handle the packet being transmitted between the source node and the destination node. In order to ensure that the packet was properly received by the destination node, a traditional end-to-end acknowledgment can be sent from the destination node to the source node once the packet is received. The source node can set a timeout interval after sending the packet. If the end-to-end acknowledgment has not been received from the destination node before the timeout interval expires, the source node retransmits the packet through the mesh network.

As described above, this traditional end-to-end timeout, acknowledgment, and retransmission protocol can become inefficient in large mesh networks with high latency and low message throughput. The timeout interval becomes unpredictable, and packets may end up being retransmitted multiple times through the network, thus unnecessarily increasing network traffic. In some cases, the packet may be lost early in the transmission cycle, but retransmission will not occur until the timeout interval expires much later.

One of the most common scenarios where a packet is lost occurs when an intermediate node in the transit route drops out of the network, taking the packet with it. FIG. 4A illustrates a flow diagram 400a of part of a wireless network transmission path, according to some embodiments. Node 402 has a packet 412 that is being passed through the wireless network 410. Using a known algorithm for determining the next hop in the transmission path, node 402 passes the packet 412 to node 404. In some cases, this transmission occurs at a link layer of the standard communication protocol. The link layer may transmit an acknowledgment from node 404 to node 402 indicating that the packet 412 has been properly received by node 404. At this point, node 402 usually relinquishes its responsibility for the packet 412 and assumes that this responsibility has been passed to node 404 upon successful receipt.

FIG. 4B illustrates a flow diagram 400b of a node dropping out of the wireless network, according to some embodiments. After receiving the packet 412 from node 402, node 404 may drop out of the wireless network 410. The reasons for dropping out of the wireless network 410 may vary. For example, node 404 may lose power as a battery discharges, it may move out of range of the wireless network 410, it may receive a software update or be reset, and/or the like. When node 404 drops out of the wireless network 410, it takes the packet 412 with it before the packet 412 can be transmitted to a subsequent node in the wireless network 410, such as node 406. Thus, the packet 412 is lost before it can be passed on, and the source node (not shown) does not know that the packet has been lost until it fails to receive an end-to-end acknowledgment from the destination node prior to the expiration of the timeout interval.

The embodiments described herein provide a solution to these and other problems by implementing a mechanism wherein each node passes responsibility for the packet to the next node along the route only after a predefined number of successful retransmissions. Instead of relinquishing responsibility after successfully transmitting the packet to a subsequent node, a node can maintain a copy of the packet in a retransmission queue until acknowledgment has been received that the packet has been successfully retransmitted to at least two nodes. This ensures that at least two nodes have responsibility for retransmitting the packet at any given time. This may eliminate single points of failure.

Additionally, instead of having a single timeout interval associated with the transmission, each intermediate node in the multi-hop transmission route may set its own timeout interval for relinquishing responsibility for the packet. These timeout intervals for each node can be much shorter, and therefore may be much more predictable than an end to end timeout interval. This may offer the advantage that packet loss due to node dropout may be recognized much earlier and remedied. Instead of waiting for the longer timeout period and retransmitting from the source node, a much shorter and more predictable timeout interval may expire and allow retransmission from an intermediate node, thus shortening the retransmission path. Additionally, instead of setting a timeout a node may start retransmission if it detects that the next node dropped out of the network. For example, node 402 in FIG. 4B can start retransmission when node 402 sees that the link to node 404 has be dropped.

Figure 5A:
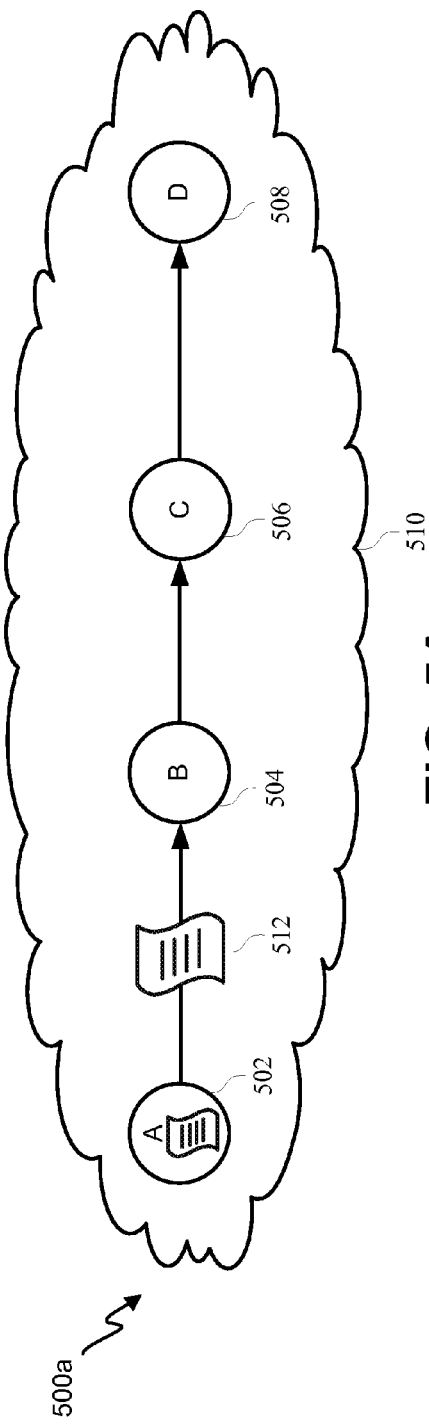

FIGS. 5A-5D illustrate flow diagrams of a reliable message delivery architecture in a mesh network, according to some embodiments. FIG. 5A illustrates a diagram 500a of a portion of a multi-hop transmission route. In this embodiment, a wireless network 510 may include many nodes. At some point, node 502 may receive or generate packet 512 for transmission to a destination node. Node 502 may represent a source node. Alternatively, node 502 may represent an intermediate node, and the source node may reside elsewhere in the network (not shown). Node 502 may transmit the packet 512 to node 504. Note 504 may indicate the successful receipt of the packet 512 by sending a link-layer acknowledgment to node 502.

Instead of immediately relinquishing responsibility for the packet 512, node 502 may maintain a stored copy of the packet following the successful transmission of the packet 512 to node 504. In some embodiments, node 502 may store the packet 512 in a retransmission queue. The retransmission queue may include packets to be retransmitted at the expiration of a timeout interval. Node 502 may begin a timeout interval upon transmission of the packet to node 504. In some cases, each time a packet is added to the retransmission queue, it may be assigned an identifier in order to detect and eliminate duplicate packets due to erroneous retransmission, as will be described below.

In some embodiments, the concept of maintaining responsibility for packet may be implemented by storing the packet in a retransmission queue and monitoring a timeout interval. Similarly, the concept of relinquishing responsibility for a packet may be implemented by allowing the packet to be removed from the retransmission queue after receiving indication(s) from a defined number of subsequent notes that the packet has been successfully retransmitted.

Figure 5B:
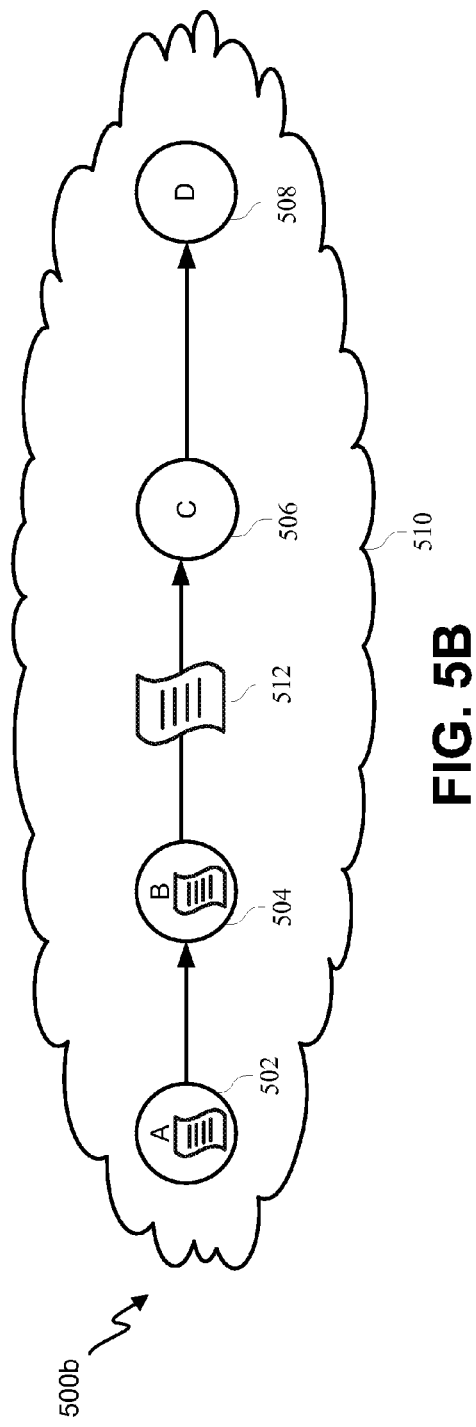

FIG. 5B illustrates a diagram 500b of at least a portion of the packet being passed to a subsequent node. After receiving the packet 512, node 504 may send the packet to a subsequent node in the wireless network 510, such as node 506. After sending the packet 512, node 504 may also store a copy of the packet 512 in its own retransmission queue. Therefore, both node 502 and node 504 can simultaneously maintain responsibility for the packet.

FIG. 5C illustrates a diagram 500c of a second portion of a multi-hop transmission route. After receiving the packet 512, node 506 may also assume responsibility for the packet by keeping it in the retransmission queue or otherwise storing a copy until it is able to relinquish responsibility. Additionally, node 506 may send a link layer indication to node 504 that it has successfully received the packet 512. To summarize, after receiving the packet 512, node 502 knows that the packet has been successfully received by node 504, and node 504 knows that the packet 512 has been successfully received by node 506. In other words, each node only has knowledge of a single subsequent hop, and thus can only maintain responsibility of the packet through a single hop.

Embodiments described herein extend the sphere of responsibility for a single node by sending and receiving a second level of acknowledgment through the network 510. For example, after receiving the link layer acknowledgment from node 506, node 504 may send an indication to node 502 that it successfully transmitted the packet to the next hop. In other words, node 502 may receive an indication from node 504 that it has successfully transmitted the packet 512 to node 506. At this point, node 502 knows that at least two additional nodes in the network 510 now have responsibility for the packet 512, and that the single point of failure has been eliminated.

FIG. 5D illustrates a diagram 500d of a wireless network wherein node 502 is allowed to relinquish responsibility for the packet 512. Upon receiving the next-hop transmission indication from node 504, node 502 may remove the stored version of the packet 512 from its retransmission queue. Also, node 506 may continue transmitting the packet 512 to a subsequent node in the network at any time after it is received by node 506. After receiving an indication that the subsequent node, such as node 508 has received the packet 512, node 506 may also send an indication back to node 504 that its next-hop transmission was successful. Node 504 could then also relinquish responsibility for the packet 512 by removing the packet 512 from its retransmission queue.

In the example above, each node's responsibility for the packet 512 was extended by one node. This is merely exemplary and not meant to be limiting. Other implementations may extend the responsibility of each node by more than one node. Indications, such as that sent from node 504 to node 502 in FIG. 5C, may be forwarded backwards through the transmission route a predefined number of times corresponding to the number of nodes in the sphere of responsibility. For example, node 502 could wait to remove the packet 512 from its retransmission queue after receiving an indication from node 504 that the packet 512 was successfully retransmitted, as well as an indication from node 506 that the packet 512 was successfully retransmitted. Thus, three nodes would maintain responsibility the packet simultaneously, thus illuminating a double-point failure.

The number of indications, or acknowledgements, that need to be received before a node can remove the packet 512 from its retransmission queue may be statically programmed into the network 510. Alternatively, the number of indications that need to be received, and thus the size of a node's sphere of responsibility may be determined dynamically. The network 510 may keep track of the number of retransmissions that have been required over a recent time interval. If the number of retransmissions exceeds a threshold, the number of retransmission indications required before a node can relinquish responsibility for packet may be increased. Similarly, if the number of retransmissions that have been required over recent time interval drops below a threshold, the number of retransmission indications required before node can relinquish responsibility for a packet may be decreased.

FIGS. 6A-6B illustrate flow diagrams of a reliable message delivery with retransmission, according to some embodiments. These embodiments may follow the same set of transaction as flowcharts 500a, 500b, and 500c from FIGS. 5A-C. However, instead of transmitting the packet 512 to node 508 in flowchart 500d of FIG. 5D, a node is lost from the network. Specifically, in FIG. 6A, the packet has been transmitted from node 602 to node 604, and then from node 604 to node 606. Node 604 may have previously sent an indication to node 602 that the packet 612 was successfully transmitted to node 606; therefore, node 602 may allow the packet 612 to be deleted or removed from its retransmission queue. Before node 606 is able to transmit the packet 612 to a subsequent node, such as node 608, node 606 is removed from the network. For example, node 602 may move out of range of other nodes in the network, or node 606 may lose power.

FIG. 6B illustrates how the network 610 can recover from the loss of node 606, according to some embodiments. Because node 604 retains responsibility for the packet 612, the contents of the packet 612 are not lost completely when node 606 left network 610. After sending the packet 612, node 604 could start a timeout timer for a predefined time interval. In this case, the timeout interval will expire before receiving an indication from node 606 that the packet 612 was successfully retransmitted. Node 604 may see that node 606 dropped out the network or was otherwise unable to successfully transmit packet 612 to the next hop, and may instead locate a new node, such as node 614 to continue packet transmission. Then, both node 604 and the new node 614 can have responsibility for the packet 612.

It should be noted that in these embodiments, only a single next-hop transmission acknowledgement expectation was used. As described above, multiple next-hop transmission acknowledgements or indications may be used to increase the points of failure that will be acceptable in the network. For example, node 602 and node 604 may have retained responsibility for the packet 612 when node 606 was lost with the network 610. These indications would be passed backwards through the transmission path to the oldest responsible node, with intermediate nodes also processing the indications but not yet releasing responsibility.

In the previously described embodiments, the nodes have sent an explicit indication, such as through the net layer, that a successful next-hop transmission has occurred. In other embodiments, another possible mechanism for retransmission can be to monitor the link layer interface to the node to which the packet was sent. If this link-layer connection is lost, the packet may then be retransmitted. Therefore, as used herein, "receiving an indication" may include both a net layer transmission as well as a link layer confirmation from a subsequent node.

In some cases, node 606 may leave the network, then subsequently rejoined the network after node 604 has retransmitted the packet 612 to the new node 614. This may lead to packet duplication, because the packet may then be retransmitted by both node 606 and node 614. In some embodiments, duplicate packet elimination may rely on sequence number tracking. For example, each time the packet 612 is retransmitted from a retransmission queue, a serial number associated with the packet may be changed. Therefore, node 606 will retransmit the packet 612 with the original serial number, while node 604 retransmit packet 612 with a new serial number. Subsequent nodes could then detect duplicate packets with different serial numbers and only perpetuate the transmission of one packet.

Another method for dealing with duplicate packet transmission may rely on a rule that a node leaving the network will release packets pending transmission and assume that the previous node(s) will retransmit the packet. For example, node 606 could detect that it left the network 610, and therefore delete any packets in its retransmission queue.

Figure 7:
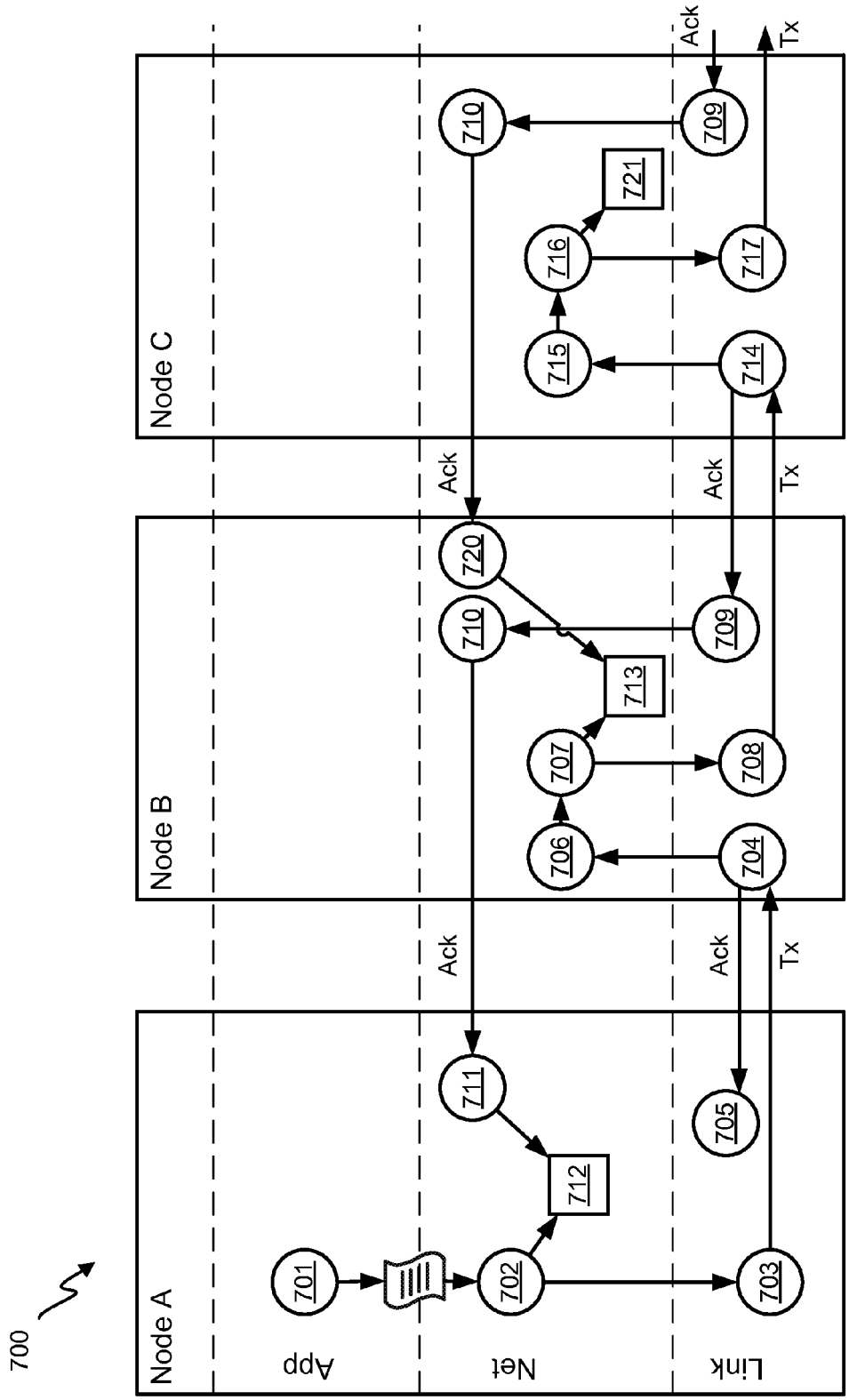
FIG. 7 illustrates a flow diagram of reliable message delivery using multiple communication layers, according to some embodiments.

FIG. 7 illustrates a flow diagram 700 of reliable message delivery using multiple communication layers, according to some embodiments. In this particular embodiment, a communication protocol is used that comprises a least three different layers, namely a link layer, a network (net) layer, and an application (app) layer. Flow diagram 700 illustrates one way in which these different layers can be utilized to achieve reliable message delivery by leveraging cooperation between these protocol stack layers.

In this example, the application layer can create a packet as part of running an application (701). The application layer can submit the packet for transmission to the network layer (702). The network layer can then submit the packet to the link layer (703), and can also keep a copy of the packet in its retransmission queue (712) and start a timeout counter with a timeout interval. The link layer can then reliably transmit the packet to a subsequent Node B through the link layer (704) and receive a subsequent acknowledgment (705). The link layer in Node B can then submit the received packet to the network layer (706). The network layer can forward or route the packet to the next hop/interface (707) and keep the packet in its retransmission queue (713). The packet can then be resubmitted to the link layer (708), which can then reliably transmit the packet to a subsequent Node C (714) with an accompanying link layer acknowledgment (709). The link layer of Node B can then inform the network layer that the packet was reliably transmitted to Node C (710). Node B can then send a network layer indication to Node A confirming that the packet was successfully retransmitted (711). Note A can then remove the packet from its retransmission queue (712).

At this point, Note B assumes responsibility of the packet and keeps the packet in the retransmission queue (713). The same process can then be repeated between Node B and Node C. Specifically, the link layer of Node C can provide the packet to the network layer (715) where the packet can be forwarded to the next hop/interface (716) and sent back to the link layer (717). Upon receiving an acknowledgment (709) of successful transmission, the link layer of Node C can inform the network layer of the successful transmission (710). A network layer indication may then be sent from Node C to Node B (720), and Node B may then release the packet from its retransmission queue (713).

It will be understood that this example details one specific implementation and is not meant to be limiting. Other implementations may adhere to the broader concepts of storing a copy of the packet for retransmission and receiving an indication from a subsequent node upon that node's transmission. Also, the user specific protocol stack layers is merely exemplary.

Figure 8:
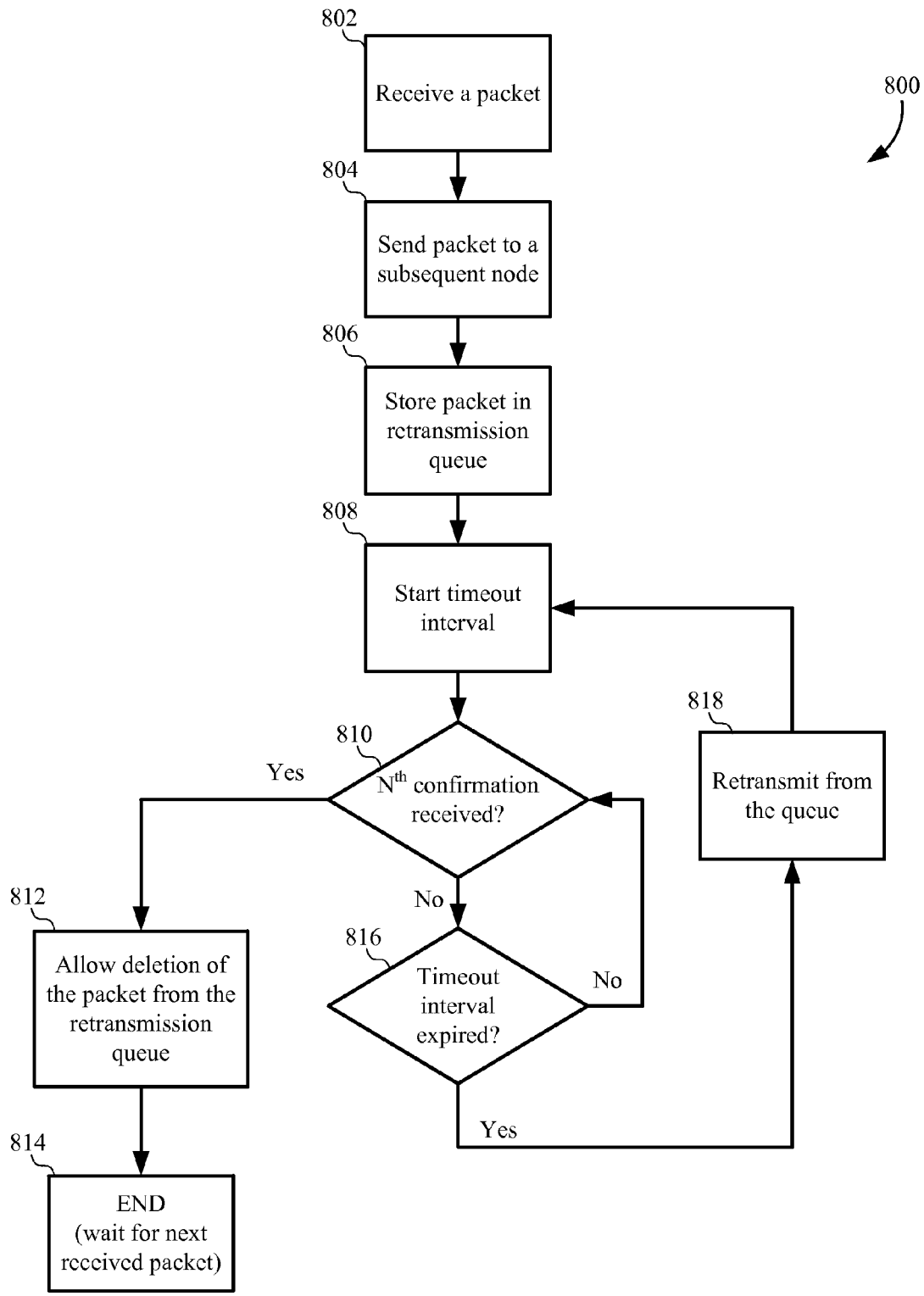
FIG. 8 illustrates a flowchart of a method for reliable message delivery in mesh networks, according to some embodiments.

FIG. 8 illustrates a flowchart 800 of a method for reliable message delivery in mesh networks, according to some embodiments. This method may be implemented by a single node in the wireless network and will be presented from that perspective. The method may include receiving a packet (802). In some embodiments, the packet may be received from a source node or from a previous node in a transmission path. The packet may also be generated by the node in an application layer and be received by a network or link layer within the same node.

The method may also include sending the packet to a subsequent node in the transmission path (804). In some embodiments, the packet may be transmitted to the subsequent node through a link layer message, and may receive an acknowledgment through the same layer. The method may further include storing the packet in a retransmission queue (806). The retransmission queue may be a dedicated software queue where multiple messages can be stored for retransmission. The retransmission queue may alternatively be a list of pointers to messages such that no new memory locations need to be allocated to store the entire packet.

The method may additionally include starting a timeout interval (808). The timeout interval may be started just prior to, or just subsequent to the packet being transmitted to the subsequent node. It should be noted that sending the packet to the subsequent node, storing the packet in the retransmission queue, and stored in the timeout interval may be carried out in any order depending upon the particular embodiment.

After sending the packet, the node may wait for one or more confirmations from subsequent nodes in the network. If N subsequent transmission indications are required before the node is allowed to release responsibility for transmitting the packet, then the process may wait until the $N^{th}$ confirmation is received (810). This confirmation may be received through a network layer in some embodiments. In other embodiments, other network layers may be used. After receiving the N$^{th}$ confirmation, the method may include allowing deletion of the packet from the retransmission queue (812). In some embodiments, this may entail actively deleting the packet from the retransmission queue or removing a pointer associated with packet. Other embodiments may flag a packet in the retransmission queue or mark of the packet for garbage collection.

In one embodiment, the network layer counts next-hop confirmations and releases the packet only upon reception of N confirmations. This means that at any given time N nodes are responsible for packet retransmission, and each link can pass N more confirmation packets. This can be kept in mind during implementation so as to keep a balance between increased network traffic and other attributes, such as low power usage, message throughput, data integrity, and/or the like. After receiving N confirmations, the node may release responsibility for packet (814).

When the timeout interval expires (816), and N confirmations are not yet been received, the node may retransmit the packet from the retransmission queue (818). Some embodiments may alter the retransmitted packet such that it can be distinguished from the originally transmitted packet. For example, a serial number may be altered, a node number may be incremented, and/or the like. After retransmission, the timeout interval may be restarted for this particular packet (808).

In some embodiments, each particular packet can have its own timeout interval associated with the packet. Therefore, multiple timeout intervals may be running at the same time in the same device. Also, although not shown explicitly in flowchart 800, the method may include passing confirmations on to previous nodes in the transmission path. When N confirmations are required, then the node can generally retransmit N−1 confirmations to the previous node in the transmission path for each transmitted packet.

It should be appreciated that the specific steps illustrated in FIG. 9 provide particular methods of reliably transmitting packets in a mesh network according to various embodiments of the present invention. Other sequences of steps may also be performed according to alternative embodiments. For example, alternative embodiments of the present invention may perform the steps outlined above in a different order. Moreover, the individual steps illustrated in FIG. 9 may include multiple sub-steps that may be performed in various sequences as appropriate to the individual step. Furthermore, additional steps may be added or removed depending on the particular applications. One of ordinary skill in the art would recognize many variations, modifications, and alternatives.

FIG. 9 is a block diagram illustrating components of an exemplary operating environment in which various embodiments of the present invention may be implemented. The system 900 can include one or more user computers 905, 910, which may be used to operate a client, whether a dedicated application, web browser, etc. The user computers 905, 910 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 905, 910 may also include wireless sensor devices, such as sensor nodes, cellar phone, smart phones, PDAs, and/or the like. The workstation representation of FIG. 9 is merely exemplary.

These user computers 905, 910 may also have any of a variety of applications, including one or more development systems, database client and/or server applications, and web browser applications. Alternatively, the user computers 905, 910 may be any other electronic device, such as a thin-client computer, Internet-enabled mobile telephone, and/or personal digital assistant, capable of communicating via a network (e.g., the network 915 described below) and/or displaying and navigating web pages or other types of electronic documents. Although the exemplary system 900 is shown with two user computers, any number of user computers may be supported.

In some embodiments, the system 900 may also include a network 915. The network may can be any type of network familiar to those skilled in the art that can support data communications using any of a variety of commercially-available protocols, including without limitation TCP/IP, SNA, IPX, AppleTalk, and the like. Merely by way of example, the network 915 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 920, 925, 930 which can be general purpose computers and/or specialized server computers (including, merely by way of example, PC servers, UNIX servers, mid-range servers, mainframe computers rack-mounted servers, etc.). One or more of the servers (e.g., 930) may be dedicated to running applications, such as a business application, a web server, application server, etc. Such servers may be used to process requests from user computers 905, 910. The applications can also include any number of applications for controlling access to resources of the servers 920, 925, 930.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 905, 910. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 905, 910.

In some embodiments, an application server may create web pages dynamically for displaying on an end-user (client) system. The web pages created by the web application server may be forwarded to a user computer 905 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 900 may also include one or more databases 935. The database(s) 935 may reside in a variety of locations. By way of example, a database 935 may reside on a storage medium local to (and/or resident in) one or more of the computers 905, 910, 915, 925, 930. Alternatively, it may be remote from any or all of the computers 905, 910, 915, 925, 930, and/or in communication (e.g., via the network 920) with one or more of these. In a particular set of embodiments, the database 935 may reside in a storage-area network ("SAN") familiar to those skilled in the art. Similarly, any necessary files for performing the functions attributed to the computers 905, 910, 915, 925, 930 may be stored locally on the respective computer and/or remotely, as appropriate. In one set of embodiments, the database 935 may be a relational database, such as Oracle 10g, that is adapted to store, update, and retrieve data in response to SQL-formatted commands.

FIG. 10 illustrates an exemplary computer system 1000, in which various embodiments of the present invention may be implemented. The system 1000 may be used to implement any of the computer systems described above. The computer system 1000 is shown comprising hardware elements that may be electrically coupled via a bus 1055. The hardware elements may include one or more central processing units (CPUs) 1005, one or more input devices 1010 (e.g., a mouse, a keyboard, etc.), and one or more output devices 1015 (e.g., a display device, a printer, etc.). The computer system 1000 may also include one or more storage device 1020. By way of example, storage device(s) 1020 may be disk drives, optical storage devices, solid-state storage device such as a random access memory ("RAM") and/or a read-only memory ("ROM"), which can be programmable, flash-updateable and/or the like.

The computer system 1000 may additionally include a computer-readable storage media reader 1025*a*, a communications system 1030 (e.g., a modem, a network card (wireless or wired), an infra-red communication device, etc.), and working memory 1040, which may include RAM and ROM devices as described above. In some embodiments, the computer system 1000 may also include a processing acceleration unit 1035, which can include a DSP, a special-purpose processor and/or the like.

The computer-readable storage media reader 1025*a* can further be connected to a computer-readable storage medium 1025*b*, together (and, optionally, in combination with storage device(s) 1020) comprehensively representing remote, local, fixed, and/or removable storage devices plus storage media for temporarily and/or more permanently containing computer-readable information. The communications system 1030 may permit data to be exchanged with the network 1020 and/or any other computer described above with respect to the system 1000.

The computer system 1000 may also comprise software elements, shown as being currently located within a working memory 1040, including an operating system 1045 and/or other code 1050, such as an application program (which may be a client application, web browser, mid-tier application, RDBMS, etc.). It should be appreciated that alternate embodiments of a computer system 1000 may have numerous variations from that described above. For example, customized hardware might also be used and/or particular elements might be implemented in hardware, software (including portable software, such as applets), or both. Further, connection to other computing devices such as network input/output devices may be employed. Software of computer system 1000 may include code 1050 for implementing embodiments of the present invention as described herein.

Each of the methods described herein may be implemented by a computer system, such as computer system 1000 in FIG. 10. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed by the computed without human intervention. Therefore, it will be understood in light of this disclosure, that each step and each method described herein may be altered to include an input and output to and from a user, or may be done automatically by a computer system. Furthermore, some embodiments of each of the methods described herein may be implemented as a set of instructions stored on a tangible, non-transitory storage medium to form a tangible software product.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of transmitting a packet in a low-power, ad-hoc, wireless mesh network, the method comprising:
   receiving, by a first node, the packet, wherein:
      the network comprises a plurality of nodes; and
      the plurality of nodes comprises the first node;
   transmitting, by the first node, at a first time, the packet from the first node to a second node in the plurality of nodes;
   receiving, by the first node, at a second time, an indication from the second node that the second node successfully transmitted the packet to a third node, wherein the second node takes responsibility for the packet; and
   maintaining, by the first node, a stored copy of the packet at the first node between the first time and the second time for retransmission, wherein the first node relinquishes responsibility for the packet after the second time.

2. A non-transitory computer-readable memory comprising a sequence of instructions which, when executed by one or more processors, causes the one or more processors to transmit a packet in a low-power, ad-hoc, wireless mesh network by:
- receiving, by a first node, the packet, wherein:
  - the network comprises a plurality of nodes; and
  - the plurality of nodes comprises the first node;
- transmitting, by the first node, at a first time, the packet from the first node to a second node in the plurality of nodes;
- receiving, by the first node, at a second time, an indication from the second node that the second node successfully transmitted the packet to a third node, wherein the second node takes responsibility for the packet; and
- maintaining, by the first node, a stored copy of the packet at the first node between the first time and the second time for retransmission, wherein the first node relinquishes responsibility for the packet after the second time.

3. The non-transitory computer-readable memory according to claim 2 wherein the instructions further cause the one or more processors to transmit a packet in a low-power, ad-hoc, wireless mesh network by:
- receiving a second packet at the first node;
- transmitting, at a third time, the second packet from the first node to the second node;
- detecting that a timeout interval has expired, wherein:
  - the timeout interval begins approximately at the third time; and
  - the timeout interval expires without the first node receiving an indication that the second packet was successfully transmitted by the second node to a subsequent node; and
- retransmitting the packet in response to detecting that the timeout interval has expired.

4. The non-transitory computer-readable memory according to claim 3 wherein the packet is retransmitted to a fourth node that is different than the second node.

5. The non-transitory computer-readable memory according to claim 2 wherein the instructions further cause the one or more processors to transmit a packet in a low-power, ad-hoc, wireless mesh network by receiving, at the first node, an acknowledgment from the second node through a link layer.

6. The non-transitory computer-readable memory according to claim 2 wherein the indication from the second node is transmitted using a net layer.

7. A system comprising:
- one or more processors; and
- a memory communicatively coupled with and readable by the one or more processors and comprising a sequence of instructions which, when executed by the one or more processors, cause the one or more processors to transmit a packet in a low-power, ad-hoc, wireless mesh network by:
- receiving, by a first node, the packet, wherein:
- the network comprises a plurality of nodes; and
- the plurality of nodes comprises the first node;
- transmitting, by the first node, at a first time, the packet from the first node to a second node in the plurality of nodes;
- receiving, by the first node, at a second time, an indication from the second node that the second node successfully transmitted the packet to a third node, wherein the second node takes responsibility for the packet; and
- maintaining, by the first node, a stored copy of the packet at the first node between the first time and the second time for retransmission, wherein the first node relinquishes responsibility for the packet after the second time.

8. The method of claim 1 wherein the third node provides the second node with an acknowledgment through a link layer.

9. The method of claim 1 wherein the first node is not an initial source of the packet, and wherein the third node is not a final destination node of the packet.

10. The method of claim 1 further comprising sending a second indication to a fourth node, wherein:
- the first node received the packet from the fourth node; and
- the second indication indicates that the packet was successfully transmitted from the first node to the second node.

11. A computer-readable memory comprising a sequence of instructions which, when executed by one or more processors, causes the one or more processors to transmit a packet in a low-power, ad-hoc, wireless mesh network by:
- receiving the packet at a first node, wherein:
  - the network comprises a plurality of nodes; and
  - the plurality of nodes comprises the first node;
- transmitting, at a first time, the packet from the first node to a second node in the plurality of nodes;
- receiving, at a second time, an indication from the second node that the second node successfully transmitted the packet to a third node; and
- maintaining a stored copy of the packet at the first node between the first time and the second time for retransmission.

12. The computer-readable memory according to claim 11 wherein the instructions further cause the one or more processors to transmit a packet in a low-power, ad-hoc, wireless mesh network by:
- receiving a second packet at the first node;
- transmitting, at a third time, the second packet from the first node to the second node;
- detecting that a timeout interval has expired, wherein:
  - the timeout interval begins approximately at the third time; and
  - the timeout interval expires without the first node receiving an indication that the second packet was successfully transmitted by the second node to a subsequent node; and
- retransmitting the packet in response to detecting that the timeout interval has expired.

13. The computer-readable memory according to claim 12 wherein the packet is retransmitted to a fourth node that is different than the second node.

14. The system of claim 11 wherein the instructions further cause the one or more processors to transmit a packet in a low-power, ad-hoc, wireless mesh network by receiving, at the first node, an acknowledgement from the second node through a link layer.

15. The system of claim 11 wherein the indication from the second node is transmitted using a net layer.

16. A system comprising:
- one or more processors; and
- a memory communicatively coupled with and readable by the one or more processors and comprising a sequence of instructions which, when executed by the one or more processors, cause the one or more processors to transmit a packet in a low-power, ad-hoc, wireless mesh network by:
- receiving the packet at a first node, wherein:
  - the network comprises a plurality of nodes; and
  - the plurality of nodes comprises the first node;
- transmitting, at a first time, the packet from the first node to a second node in the plurality of nodes;

receiving, at a second time, an indication from the second node that the second node successfully transmitted the packet to a third node; and maintaining a stored copy of the packet at the first node between the first time and the second time for retransmission.

17. The system of claim 16 wherein the instructions further cause the one or more processors to transmit a packet in a low-power, ad-hoc, wireless mesh network by:

receiving a second packet at the first node;

transmitting, at a third time, the second packet from the first node to the second node;

detecting that a timeout interval has expired, wherein:
the timeout interval begins approximately at the third time; and
the timeout interval expires without the first node receiving an indication that the second packet was successfully transmitted by the second node to a subsequent node; and retransmitting the packet in response to detecting that the timeout interval has expired.

18. The system of claim 17 wherein the packet is retransmitted to a fourth node that is different than the second node.

19. The system of claim 16 wherein the instructions further cause the one or more processors to transmit a packet in a low-power, ad-hoc, wireless mesh network by receiving, at the first node, an acknowledgement from the second node through a link layer.

20. The system of claim 16 wherein the indication from the second node is transmitted using a net layer.

* * * * *

UNITED STATES PATENT AND TRADEMARK OFFICE
CERTIFICATE OF CORRECTION

| | | |
|---|---|---|
| PATENT NO. | : 8,831,008 B1 | Page 1 of 5 |
| APPLICATION NO. | : 14/062689 | |
| DATED | : September 9, 2014 | |
| INVENTOR(S) | : Anatoli Gostev et al. | |

It is certified that error appears in the above-identified patent and that said Letters Patent is hereby corrected as shown below:

In the Claims:

From column 16, line 52 through column 19, line 30, please delete the whole claims set and replace it with the following:

1. A method of transmitting a packet in a low-power, ad-hoc, wireless mesh network, the method comprising:

receiving, by a first node, the packet, wherein:

the network comprises a plurality of nodes; and the plurality of nodes comprises the first node;

transmitting, by the first node, at a first time, the packet from the first node to a second node in the plurality of nodes;

receiving, by the first node, at a second time, an indication from the second node that the second node successfully transmitted the packet to a third node, wherein the second node takes responsibility for the packet; and maintaining, by the first node, a stored copy of the packet at the first node between the first time and the second time for retransmission, wherein the first node relinquishes responsibility for the packet after the second time.

2. The method of claim 1 further comprising:

receiving a second packet at the first node;

Signed and Sealed this
Twenty-fifth Day of August, 2015

Michelle K. Lee
*Director of the United States Patent and Trademark Office* transmitting, at a third time, the second packet from the first node to the second node;

detecting that a timeout interval has expired, wherein:

the timeout interval begins approximately at the third time; and the timeout interval expires without the first node receiving an indication that the second packet was successfully transmitted by the second node to a subsequent node; and retransmitting the packet in response to detecting that the timeout interval has expired.

3. The method of claim 2 wherein the packet is retransmitted to a fourth node that is different than the second node.

4. The method of claim 1 further comprising receiving, at the first node, an acknowledgement from the second node through a link layer.

5. The method of claim 4 wherein the indication from the second node is transmitted using a net layer.

6. The method of claim 1 wherein the stored copy of the packet is maintained at the first node by storing the packet in a retransmission queue.

7. The method of claim 1 wherein the first node comprises a wireless communication device that includes a battery, a sensor, a processor, and a memory.

8. The method of claim 1 wherein the third node provides the second node with an acknowledgment through a link layer 9. The method of claim 1 wherein the first node is not an initial source of the packet, and wherein the third node is not a final destination node of the packet.

10. The method of claim 1 further comprising sending a second indication to a fourth node, wherein:

the first node received the packet from the fourth node; and the second indication indicates that the packet was successfully transmitted from the first node to the second node.

11. A non-transitory computer-readable memory comprising a sequence of instructions which, when executed by one or more processors, causes the one or more processors to transmit a packet in a low-power, ad-hoc, wireless mesh network by:

receiving, by a first node, the packet, wherein:

the network comprises a plurality of nodes; and the plurality of nodes comprises the first node;

transmitting, by the first node, at a first time, the packet from the first node to a second node in the plurality of nodes;

receiving, by the first node, at a second time, an indication from the second node that the second node successfully transmitted the packet to a third node, wherein the second node takes responsibility for the packet; and maintaining, by the first node, a stored copy of the packet at the first node between the first time and the second time for retransmission, wherein the first node relinquishes responsibility for the packet after the second time.

12. The non-transitory computer-readable memory according to claim 11 wherein the instructions further cause the one or more processors to transmit a packet in a low-power, ad-hoc, wireless mesh network by:

receiving a second packet at the first node;

transmitting, at a third time, the second packet from the first node to the second node;

detecting that a timeout interval has expired, wherein:

the timeout interval begins approximately at the third time; and the timeout interval expires without the first node receiving an indication that the second packet was successfully transmitted by the second node to a subsequent node; and retransmitting the packet in response to detecting that the timeout interval has expired.

13. The non-transitory computer-readable memory according to claim 12 wherein the packet is retransmitted to a fourth node that is different than the second node.

14. The non-transitory computer-readable memory according to claim 11 wherein the instructions further cause the one or more processors to transmit a packet in a low-power, ad-hoc, wireless mesh network by receiving, at the first node, an acknowledgement from the second node through a link layer.

15. The non-transitory computer-readable memory according to claim 11 wherein the indication from the second node is transmitted using a net layer.

16. A system comprising:

one or more processors; and a memory communicatively coupled with and readable by the one or more processors and comprising a sequence of instructions which, when executed by the one or more processors, cause the one or more processors to transmit a packet in a low-power, ad-hoc, wireless mesh network by:

receiving, by a first node, the packet, wherein:

the network comprises a plurality of nodes; and the plurality of nodes comprises the first node;

transmitting, by the first node, at a first time, the packet from the first node to a second node in the plurality of nodes;

receiving, by the first node, at a second time, an indication from the second node that the second node successfully transmitted the packet to a third node, wherein the second node takes responsibility for the packet; and maintaining, by the first node, a stored copy of the packet at the first node between the first time and the second time for retransmission, wherein the first node relinquishes responsibility for the packet after the second time.

17. The system of claim 16 wherein the instructions further cause the one or more processors to transmit a packet in a low-power, ad-hoc, wireless mesh network by:

receiving a second packet at the first node;

transmitting, at a third time, the second packet from the first node to the second node;

detecting that a timeout interval has expired, wherein:

the timeout interval begins approximately at the third time; and the timeout interval expires without the first node receiving an indication that the second packet was successfully transmitted by the second node to a subsequent node; and retransmitting the packet in response to detecting that the timeout interval has expired.

18. The system of claim 17 wherein the packet is retransmitted to a fourth node that is different than the second node.

CERTIFICATE OF CORRECTION (continued)
U.S. Pat. No. 8,831,008 B1

19. The system of claim 16 wherein the instructions further cause the one or more processors to transmit a packet in a low-power, ad-hoc, wireless mesh network by receiving, at the first node, an acknowledgement from the second node through a link layer.

20. The system of claim 16 wherein the indication from the second node is transmitted using a net layer.